United States Patent Office 3,239,541
Patented Mar. 8, 1966

3,239,541
6-HALOMETHYL ANDROSTANES
Albert Bowers and John Edwards, Mexico City, Mexico, assignors, by mesne assignments, to Syntex Corporation, a corporation of Panama
No Drawing. Filed Sept. 27, 1960, Ser. No. 58,626
19 Claims. (Cl. 260—397.4)

The present invention relates to novel cyclopentanophenanthrene compounds and to a novel process for the production thereof.

More particularity the present invention relates to novel C–6 monofluoromethyl, C–6 difluoromethyl and C–6 trifluoromethyl derivatives of the androstane series and more specifically to derivatives of the androstane series having a keto, hydroxy or acyloxy group at C–3, a hydroxy or acyloxy group at C–17β, an aliphatic hydrocarbon group at C–17α, and unsaturation at C–1,2, C–4,5 and/or C–6,7.

The novel compounds of the present invention which are useful anabolic and androgenic agents exhibiting anti-estrogenic activity are represented by the following formulas; in which the wavy line indicates either the α or β steric configuration:

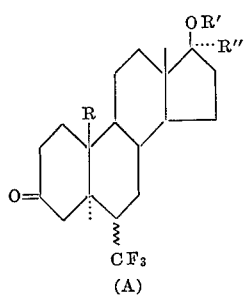
(A)

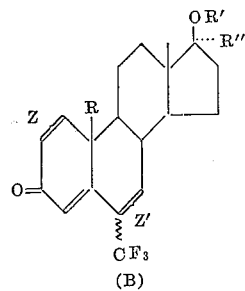
(B)

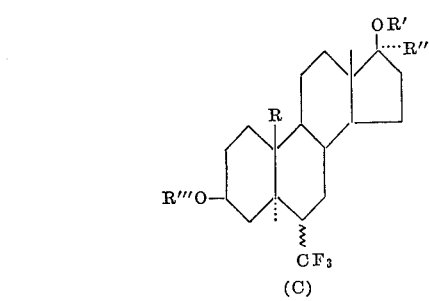
(C)

In the above formulas, R represents hydrogen or methyl; R′ and R′′′ represent hydrogen or the acyl radical of a hydrocarbon carboxylic acid; R″ represents hydrogen or an aliphatic hydrocarbon radical, saturated or unsaturated, containing up to 8 carbon atoms; Z indicates a double bond or a saturated linkage between C–1 and C–2, and Z′ indicates a double bond or a saturated linkage between C–6 and C–7.

The acyl group is derived from a hydrocarbon carboxylic acid containing less than 12 carbon atoms, saturated or unsaturated, of straight, branched, cyclic or cyclic-aliphatic chain, aromatic and may be substituted by functional groups such as hydroxy, acyloxy of up to 5 carbon atoms, alkoxy of up to 5 carbon atoms, nitro, amino or halogen. Typical ester groups are the acetate, propionate, butyrate, enanthate, benzoate, trimethylacetate, t-butylacetate, phenoxyacetate, hemisuccinate, cyclopentylpropionate, aminoacetate, and β-chloropropionate.

Typical aliphatic hydrocarbon groups at C–17α are methyl, ethyl, propyl, butyl, vinyl, 1-propenyl, 2-butenyl, ethinyl and 1-butinyl.

In addition to the activity set forth above, compounds of Formula A also exhibit central nervous depressant activity; compounds of Formula B exhibit antifungal activity and lower the blood cholesterol level and compounds of Formula C are also useful for the relief of premenstrual tension.

The novel compounds of the present invention which exhibit anti-gonadotrophic activity and anti-bacterial activity in addition to anti-estrogenic activity, anti-fungal activity, central nervous system depressant activity and also useful as a relief in the treatment of premenstrual tension, are the useful androgenic and anabolic agents of the following formulas:

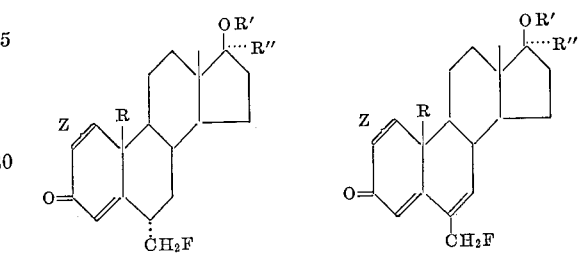

In the above formulas, R, R′ and R″ have the same meaning as previously set forth; Z indicates a double bond or a saturated linkage between C–1 and C–2.

The novel compounds of the present invention which are also useful anabolic and androgenic agents are represented by the following formulas:

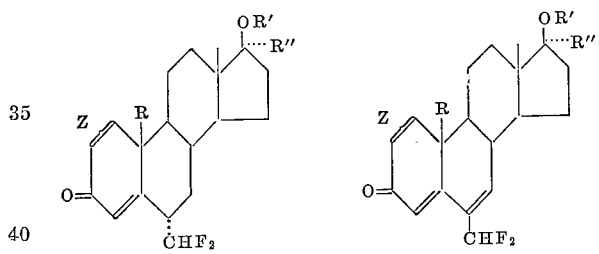

In the above formulas R, R′, R″ and Z have the same meaning as set forth above.

The novel compounds of the present invention having a trifluoromethyl group at C–6 are prepared by a process illustrated by the following equation:

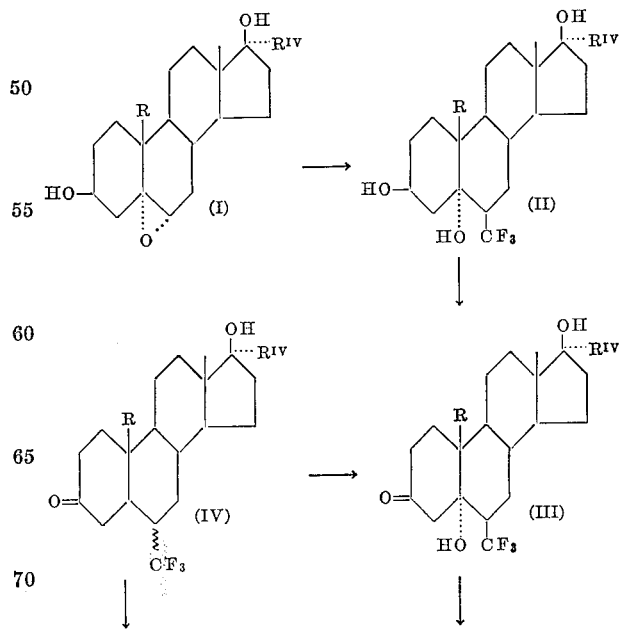

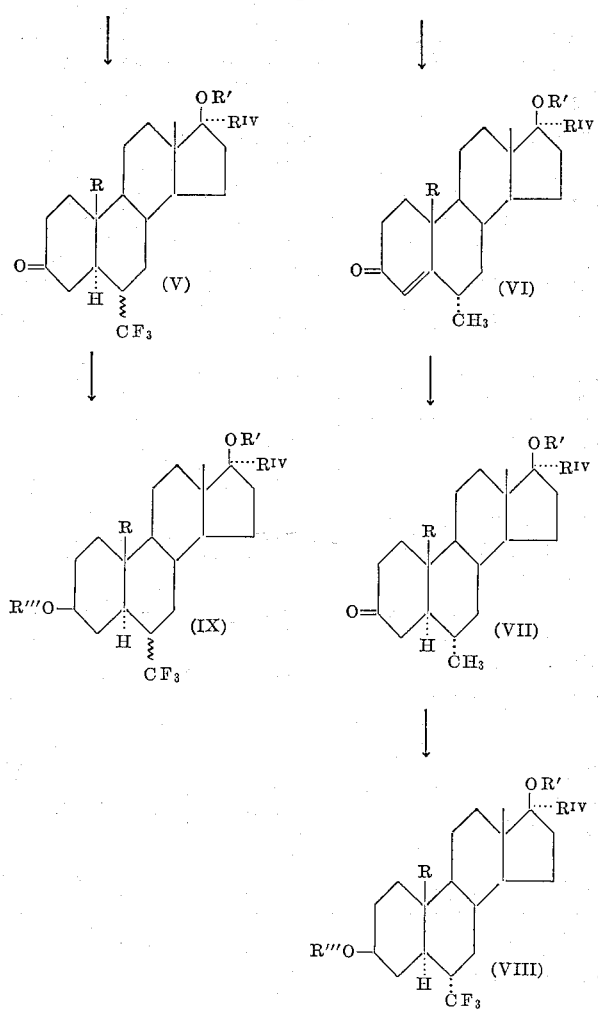

In the above equation $R^{IV}$ represents an aliphatic hydrocarbon group, saturated or unsaturated, containing up to 8 carbon atoms.

In the above equation, R, R' and R''' have the same meaning as previously set forth.

In practicing the process outlined above, a $5\alpha,6\alpha$-epoxide of androstane-$3\beta,17\beta$-diol, with an aliphatic hydrocarbon group at C-17$\alpha$, or the corresponding 19-nor derivative (I) is treated with a trifluoromethyl magnesium halide, preferably trifluoromethyl magnesium iodide, in a solvent such as tetrahydrofuran, diethyl ether, dioxane or anisole, at a low temperature in the order of $-30°$ C. to $20°$ C., preferably at about $-20°$ C., to open the epoxide ring to form the corresponding $5\alpha$-hydroxy-$6\beta$-trifluoromethyl derivative (II). Upon oxidation of the latter compound with 8 N chromic acid, the $3\beta$-hydroxy group is converted into the 3-keto group (III) and, by further treatment with thionyl chloride, dehydration at C-5 is effected and there is formed the $6\beta$-trifluoromethyl-$\Delta^4$-3-keto grouping (IV: R'=hydrogen). For esterification of the tertiary hydroxyl group at C-17$\beta$ the reaction is effected in benzene solution with a hydrocarbon carboxylic acid anhydride and in the presence of catalytic amounts of p-toluenesulfonic acid with concomitant inversion of the $6\beta$-trifluoromethyl group to the $6\alpha$-position. By hydrogenation, the $6\alpha$-trifluoromethyl-$\Delta^4$-3-keto-$17\beta$-acylate (IV: R'=acyl) or the $6\beta$-trifluoromethyl-$\Delta^4$-3-keto compound (IV: R'=hydrogen) with hydrogen in the presence of a palladium on charcoal catalyst, hydrogen is added to the double bond and there is formed the corresponding 3-keto-5-allo-$6\alpha$-trifluoromethyl-$17\beta$-acylate or the 3-keto-5-allo-$6\beta$-trifluoromethyl derivative (V). The latter compound may be esterified in the same manner as set forth previously if a free hydroxyl group is present. The free alcohol (V: R'=hydrogen) or the ester (V: R'=acyl) is then further reduced by reaction with a double metal hydride such as borohydride to form the corresponding $3\beta$-hydroxy derivatives (IX: R'=R'''= hydrogen; and R'=acyl, R'''=hydrogen). Conventional esterification of the $3\beta,17\beta$-dihydroxy-$17\alpha$-hydrocarbon compounds (IX: R'=R'''=hydrogen) affords the C-3 monoesters (IX: R'''=acyl; R'=hydrogen). Esterification of the C-17$\beta$ tertiary hydroxyl group may then be effected with the same or different acid anhydride in the manner described heretofore in benzene solution and in the presence of p-toluenesulfonic acid to afford 17$\alpha$-aliphatic hydrocarbon-$3\beta,17\beta$-diesters having the same or different ester group (IX: R'=R'''=acyl).

Alternatively, by treatment of the 3-keto-$5\alpha$-hydroxy-$6\beta$-trifluoromethyl derivative (III) with methanolic potassium hydroxide, dehydration at C-5 with simultaneous inversion of the steric configuration at C-6 is effected to thus yield the 3-keto-$\Delta^4$-$6\alpha$-trifluoromethyl derivative (VI). Upon treatment of the latter compound with liquid ammonia and lithium, the 3-keto-$\Delta^4$-grouping is converted into the 3-keto-5-allo-grouping (VII) and upon reaction with sodium borohydride as described previously the latter compound is transformed into the corresponding $3\beta$-hydroxy-5-allo-$6\alpha$-trifluoromethyl-derivatives (VIII). Prior to or subsequent to the treatment with liquid ammonia and lithium or prior to the reduction with sodium borohydride, esterification of the tertiary hydroxyl group at C-17$\beta$ may be effected in the same manner as previously described thus yielding the C-17 monoesters of the $6\alpha$-trifluoromethyl-$\Delta^4$-3-keto-compounds (VI) or of the $6\alpha$-trifluoromethyl-3-keto-5-allo compound (VII). Conventional esterification of the $6\alpha$-trifluoromethyl-5-allo-$3\beta,17\beta$-diol-17-acylate affords the diester having the same or different ester groups (VIII: R'=R'''=acyl) as set forth for the corresponding $6\beta$-trifluoromethyl compounds, or the C-3-monoesters (VIII: R'=hydrogen; R'''=acyl) where a free hydroxy group is present at C-17$\beta$. By esterification of the tertiary hydroxyl group of the latter derivative by the method described previously in benzene solution and in the presence of p-toluenesulfonic acid, there are formed the diesters having the same or different ester groups (VIII: R'=R'''=acyl).

Where the 19-nor compound is employed as the starting material in the above process there are formed all of the above compounds having the angular methyl at C-10 replaced by hydrogen.

The preparation of the novel compounds of the present invention having a trifluoromethyl group at C-6 and a secondary hydroxyl group at C-17$\beta$ is effected by reacting $\Delta^5$-androstene-$3\beta,17\beta$-diol-17-monobenzoate with a peracid such as monoperphthalic acid to form the corresponding $5\alpha,6\alpha$-oxido compound. By following the procedure outlined above, the latter compound is reacted with a trifluoromethyl magnesium halide and the resulting $6\beta$-trifluoromethyl-androstane-$3\beta,5\alpha,17\beta$-triol-17-monobenzoate is oxidized with 8 N chromic acid to convert the $3\beta$-hydroxy group to the keto group. Treatment of the thus formed $6\beta$-trifluoromethyl-androstane-$5\alpha,17\beta$-diol-3-one-17-monobenzoate with methanolic potassium hydroxide results in saponification of the ester group and dehydration at C-5 with simultaneous inversion of the steric configuration at C-6 to afford $6\alpha$-trifluoromethyl-$\Delta^4$-androsten-$17\beta$-ol-3-one. The latter may then be esterified by conventional reaction with hydrocarbon carboxylic acid anhydrides or chlorides to afford the esters thereof.

Upon treatment of the $6\alpha$-trifluoromethyl-$\Delta^4$-androsten-$17\beta$-ol-3-one or the ester thereof with liquid ammonia and lithium, the 3-keto-$\Delta^4$-grouping is converted into the 3-keto-5-allo grouping, which upon reaction with sodium borohydride as described previously, results in the formation of the diol, 6α-trifluoromethyl-androstane-3β,17β-diol or the 17-ester thereof. Conventional esterification of the diol with hydrocarbon carboxylic acid anhydrides affords the diester having the same ester groups while esterification of the 17-mono ester affords the diester having the same or different ester groups depending upon the acid anhydride that is employed.

The 6-dehydro derivatives are obtained by refluxing the 6α-trifluoromethyl-Δ⁴-compounds with chloranil in a solvent such as tertiary butanol.

For introduction of a double bond at C–1,2, the 6α-trifluoromethyl-Δ⁴ compound or the 6-trifluoromethyl-Δ⁴,⁶-compound is refluxed with 2,3-dichloro-5,6-dicyano-benzoquinone or with selenium dioxide in an inert solvent, to thus afford the 6α-trifluoromethyl-Δ¹,⁴ or 6-trifluoromethyl-Δ¹,⁴,⁶ compounds. The latter compound can also be obtained by the reaction of the Δ¹,⁴-compound with chloranil.

In another aspect of the present invention, the 6α-trifluoromethyl-Δ⁴-3-keto compounds may be prepared by treating a 3β-hydroxy-5-allo-6-keto-androstane with a trifluoromethyl Grignard reagent to effect formation of the corresponding 3β-hydroxy-5-allo-6α-trifluoromethyl-6β-hydroxy derivative. By esterifying the secondary hydroxyl group at C–3 by conventional methods followed by dehydration at C–6 as by treatment with thionyl chloride in pyridine solution at about 0° C., there is formed the corresponding 3β-acyloxy-6-trifluoromethyl-Δ⁵-androstene derivative. Saponification of the ester group as by treatment with dilute methanolic potassium hydroxide results in the formation of the 3β-hydroxy-Δ⁵-6-trifluoromethyl-derivatives which, upon conventional oxidation with chromic acid in acetone is converted into the 3-keto-Δ⁵-6-trifluoromethyl derivative. Treatment of the latter with an acid or a base preferably an ethanolic solution of oxalic acid results in a shift of the Δ⁵-double bond to a Δ⁴-double bond with concurrent inversion of the steric configuration at C–6.

The following equation illustrates this process insofar as rings A and B are concerned:

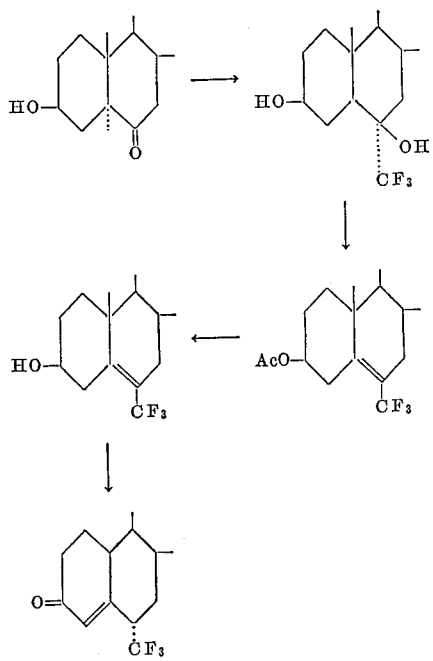

In the above equation Ac represents the acyl radical of a hydrocarbon carboxylic acid of less than 12 carbon atoms.

The novel compounds of the present invention having a monofluoromethyl group at C–6 are prepared by a process illustrated by the following equation:

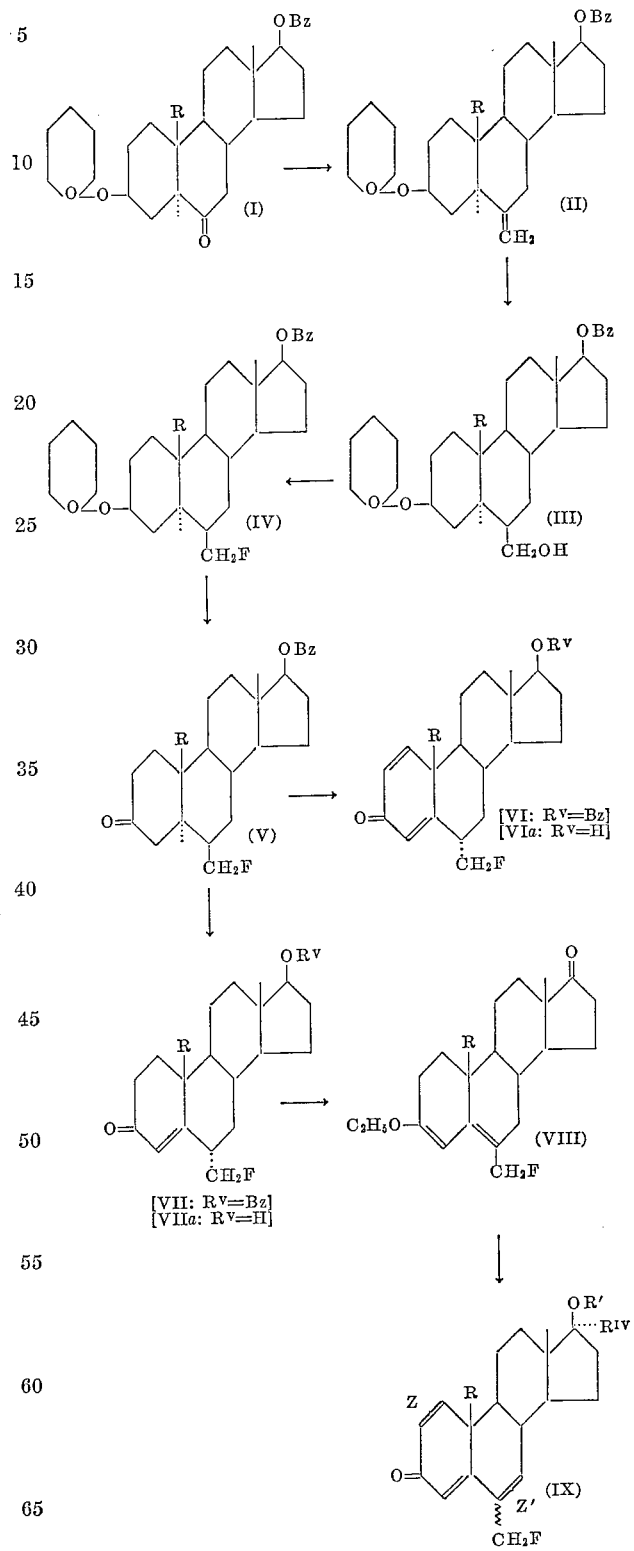

In the above equation, Bz represents the benzoyl radical, and R, R′, R^IV and Z have the same meaning as previously set forth; and Z′ indicates a double bond or a saturated linkage between C–6 and C–7.

In practicing the process outlined above, the starting material, 3β-tetrahydropyranyloxy-17β-benzoyloxyandrostan-6-one is prepared by etherfying Δ⁵-androstene-3β,17β-diol-17-benzoate with dihydropyran to form the 3β-tetrahydropyranyloxy derivative. For introduction of the keto group at C-6, the latter compound is treated with a current of diborane in a solvent such as tetrahydrofuran. Upon subsequent reaction with aqueous alkali and hydrogen peroxide there is formed the 6α-hydroxy derivative which is converted into the 6-keto compound (I) upon reaction with chromic oxide in pyridine. By adding the thus prepared 3β-tetrahydropyranyloxy-17β-benzoyloxy-androstan-6-one (I) to a mixture of triphenylphosphonium methyl bromide and butyl-lithium in ether solution and under an atmosphere of nitrogen, there is afforded the 3-tetrahydropyranyl ether of 6-methylene-androstane-3β,17β-diol-17-benzoate (II), which upon treatment with diborane and aqueous alkaline peroxide as described above is transformed into the 6β-hydroxymethyl derivative (III). By reaction of the latter compound with mesyl chloride and pyridine, there is formed the corresponding mesylate which is treated with potassium fluoride in a solvent such as dimethylformamide to obtain the 3-tetrahydropyranyl ether of 6β-monofluoromethyl-androstane-3β,17β-diol-17-benzoate (IV). Hydrolysis of the latter compound with hydrochloric acid in acetone followed by oxidation with chromic acid in acetone yields 6β-monofluoromethyl-androstan-17β-ol-3-one benzoate (V) which can be dehydrogenated at C-1,2 and C-4,5 by conventional methods. Thus, by dibromination at C-2 and C-4 with concurrent inversion of the steric configuration at C-6 followed by dehydrobromination as for example by reaction with calcium carbonate in dimethylformamide, there is obtained the benzoate of 6α-monofluoromethyl-Δ^{1,4}-androstadien-17β-ol-3-one (VI) which upon treatment with methanolic potassium hydroxide is saponified to yield the free alcohol, 6α-monofluoromethyl-1-dehydro-testosterone (VIa). Alternatively by dibromination of 6β-monofluoromethyl-androstan-17β-ol-3-one benzoate at C-2 and C-4 with simultaneous inversion of the steric configuration at C-6, followed by heating with an alkali metal iodide, there is formed the 2-iodo-Δ^4-3-keto 6α-monofluoromethyl derivative which is subsequently deiodinated by refluxing with a tertiary amine such as collidine to afford 6α-monofluoromethyl-testosterone benzoate (VII) which is converted into the free alcohol upon treatment with methanolic potassium hydroxide to obtain 6α-monofluoromethyl-testosterone (VIIa).

Reesterification of the free hydroxyl group with hydrocarbon carboxylic acid anhydrides or chlorides containing less than 12 carbon atoms is effected by conventional methods to thus produce the esters of 6α-monofluoromethyl-testosterone and of the corresponding 1-dehydro derivatives.

For introduction of an aliphatic hydrocarbon group at C-17α, the 17β-hydroxyl group of 6α-monofluoromethyl testosterone (VIIa) is oxidized to the keto group by reaction with 8 N chromic acid in acetone and the keto group at C-3 is protected by formation of the enol ether as by reaction with ethyl orthoformate with concomitant migration of the double bond to C-5,6. The resulting 3-ethoxy-Δ^{3,5}-androstadien-17-one (VIII) is then reacted with an aliphatic hydrocarbon magnesium halide to convert the 17-keto group into the 17β-hydroxy-17α-aliphatic hydrocarbon grouping. Thus by reaction with methyl magnesium bromide, the 17α-methyl-17β-hydroxy grouping is formed and by similar reaction with an ethyl, vinyl, ethinyl, or ethoxyethinyl Grignard reagent, there is formed the 17β-hydroxy compound with the respective hydrocarbon radical at C-17α. Alternatively the 17α-ethyl group is obtained by reaction with ethyl-lithium and the ethinyl group is introduced by the conventional reaction with potassium acetylide. Upon subsequent acidification the ether group is hydrolyzed with regeneration of the 3-keto group to afford 6α-monofluoromethyl-17α-aliphatic hydrocarbon-testosterone (IX: Z=Z'=saturated linkage; R'=hydrogen).

For introduction of an additional double bond at C-1,2, the 6α-monofluoromethyl-17α-aliphatic hydrocarbon testosterone is refluxed with selenium dioxide, preferably in mixture with tertiary butanol and in the presence of catalytic amounts of pyridine under an atmosphere of nitrogen or with 2,3-dichloro-5,6-dicyano-1,4-benzoquinone in dioxane to yield 6α-monofluoromethyl-17α-aliphatic hydrocarbon-1-dehydro-testosterone (IX: Z=double bond; Z'=saturated linkage; R'=hydrogen).

The 6-dehydro derivative of 6α-monofluoromethyl-17α-aliphatic hydrocarbon-testosterone (IX: Z=saturated linkage; Z'=double bond; R'=hydrogen) is obtained by reacting the 6α-monofluoromethyl-17α-aliphatic hydrocarbon-testosterone with a quinone such as chloranil in an inert solvent such as tertiary butanol, xylene or a mixture of ethyl acetate or amyl acetate and acetic acid.

The 1,6-bis dehydro derivative of 6α-monofluoromethyl-17α-aliphatic hydrocarbon-testosterone (IX: Z=Z'=double bond; R'=hydrogen) is obtained either by refluxing the 1-dehydro derivative, described above, with chloranil or by refluxing the 6-dehydro derivative with selenium dioxide to afford the 6α-monofluoromethyl-17α-aliphatic hydrocarbon-1,6-bis-dehydro-testosterone.

The tertiary hydroxyl group at C-17α can be esterified prior to or subsequent to the dehydrogenation at C-1,2 or C-6,7 by reacting the 6α-monofluoromethyl-17α-hydrocarbon-testosterone (IX: Z=Z'=saturated linkage; R'=hydrogen) or the 1-dehydro, 6-dehydro or 1,6-bis-dehydro derivative thereof with a hydrocarbon carboxylic acid anhydride containing less than 12 carbon atoms in benzene solution and in the presence of p-toluenesulfonic acid.

By starting with the corresponding 19-nor-androstene-3β,17β-diol, described by Villotti et al., J. Am. Chem. Soc., 81, 4568 (1959), and by following the process outlined above, all of the corresponding 19-nor derivatives are produced.

The novel compounds of the preesnt invention having a difluoromethyl group at C-6 are prepared by a process illustrated by the following equation:

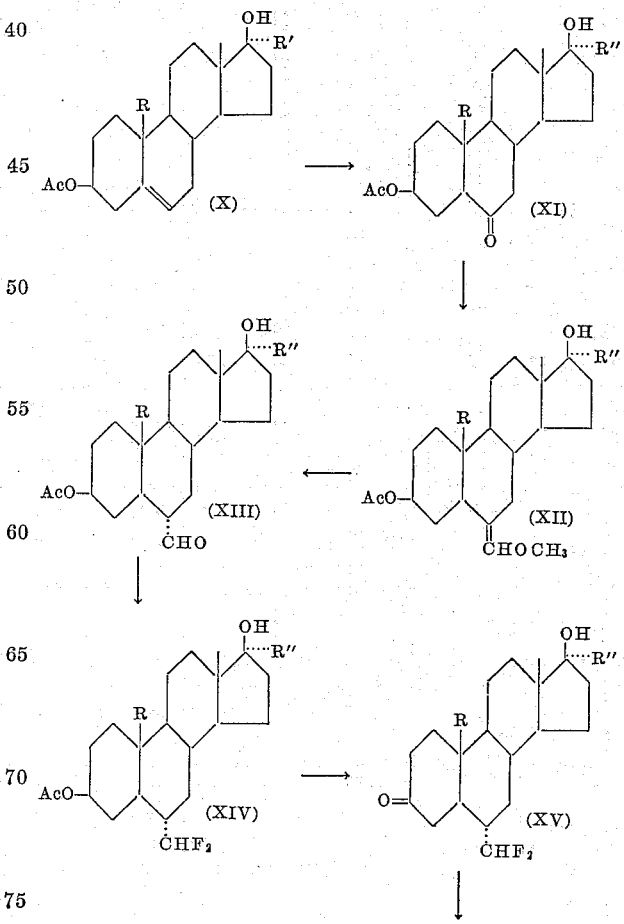

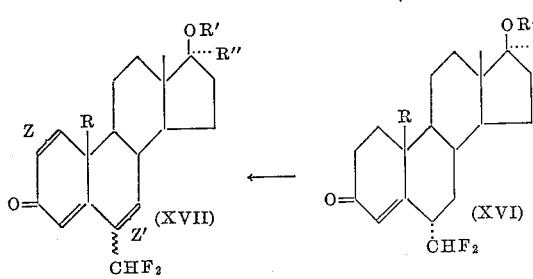

In the above formulas, Ac represents the acyl radical of a hydrocarbon carboxylic acid, preferably the acetyl group; R, R', R", Z and Z' have the same meaning as previously set forth.

In practicing the process outlined above, $\Delta^5$-androstene-3β,17β-diol-3-acetate or 17α-aliphatic hydrocarbon-$\Delta^5$-androstene-3β,17β-diol-3-acetate or the 19-nor derivative (X) is reacted in dioxane solution containing a catalytic amount of perchloric acid with N-bromoacetamide to form 5α-bromo-androstane-3β,6β,17β-triol-3-acetate or the 17α-aliphatic hydrocarbon derivative thereof, which upon oxidation with chromic trioxide in acetone is converted into the corresponding 6-keto derivative. Reductive debromination of the latter derivative as by treatment with zinc and acetic acid affords the 3β-acetate of androstane-3β,17β-diol-6-one or of 17α-aliphatic hydrocarbon-androstane-3β,17β-diol-6-one (XI). By adding the 6-keto derivative (XI) to a mixture of triphenyl (methoxymethyl) phosphonium chloride and phenyl lithium in ether solution under an atmosphere of nitrogen, there is afforded the 6-methoxymethylene-androstane-3β,17β-diol-3-acetate or the 17α-aliphatic hydrocarbon derivative thereof (XII), which upon treatment with perchloric acid is converted into the corresponding 6α-carboxaldehyde derivative (XIII). Upon reaction of the aldehyde with 2 molar equivalents of sulfur tetrafluoride in benzene in a sealed tube, there is formed the corresponding 6α-difluoromethyl derivative (XIV) which upon hydrolysis with dilute methanolic potassium hydroxide followed by oxidation with chromic acid of the thus formed 6α-difluoromethyl-androstane-3β,17β-diol or the 6α-difluoromethyl-17α-aliphatic hydrocarbon-androstane-3β,17β-diol to form the corresponding 3-keto derivative (XV). A double bond is then introduced at C–4,5 by dibromination at C–2 and C–4 followed by treatment with an alkali metal iodide to form the 2-iodo-$\Delta^4$-3-keto derivative, which is then deiodinated by refluxing with a tertiary amine such as collidine or treated with chromous chloride as described by Rosenkranz et al., J. Am. Chem. Soc. 72, 4077 (1950) to form 6α-difluoromethyl testosterone or 6α-difluoromethyl-17α-aliphatic hydrocarbon-testosterone (XVI). For introduction of a double bond at C–1,2 and/or at C–6,7, the methods of dehydrogenation with selenium dioxide, 2,3-dichloro-5,6-dicyano-1,4-benzoquinone or chloranil, previously described, are employed to thus form the 1-dehydro, 6-dehydro or 1,6-bis-dehydro compounds (XVII).

Esterification of the tertiary hydroxy group with hydrocarbon carboxylic acid anhydrides of the type previously mentioned can be conducted prior to or subsequent to the steps of dehydrogenation.

The following examples serve to illustrate but are not intended to limit the scope of the invention.

PREPARATION 1

A solution of 5 g. of 17α-ethyl-$\Delta^5$-androsten-3β,17β-diol in 100 cc. of chloroform was treated with 1.5 mols of an ethereal solution of monoperphthalic acid; the mixture was kept for 20 hours at room temperature and diluted with water, the organic layer was separated, washed with water, sodium carbonate solution and again with water to neutral, dried over anhydrous sodium sulfate and evaporated to dryness under reduced pressure. Crystallization of the residue from acetone-hexane yielded 5α,6α-oxido-17α-ethyl-androstan-3β,17β-diol.

PREPARATION 2

In accordance with the method of the preceding preparation, treatment of 17α-methyl-19-nor-$\Delta^5$-androstene-3β,17β-diol, 17α-ethyl-19-nor-$\Delta^5$-androstene-3β,17β-diol, 17α-ethinyl-19-nor-$\Delta^5$-androstene-3β,17β-diol and 17α-vinyl-19-nor-$\Delta^5$-androstene-3β,17β-diol, with 1.5 molar equivalents of monoperphthalic acid gave the corresponding 5α,6α-oxido derivatives, namely 17α-methyl-5α,6α-oxido-19-nor-androstan-3β,17β-diol,
17α-ethyl-5α,6α-oxido-19-nor-androstan-3β,17β-diol,
17α-ethinyl-5α,6α-oxido-19-nor-androstan-3β,17β-diol and
17α-vinyl-5α,6α-oxido-19-nor-androstan-3β,17β-diol.

*Example I*

A solution of 5 g. of the 17α-ethinyl-5α,6α-oxido-androstan-3β,17β-diol, described in U.S.P. 2,838,500, in 250 cc. of anhydrous tetrahydrofuran was added slowly over 45 minutes with stirring, at a temperature between −20° C. and −10° C. and under an atmosphere of nitrogen to a solution of 3 g. of trifluoromethyl magnesium iodide, in 150 cc. of tetrahydrofuran, prepared according to the directions of Haszeldine et al. in J. Chem. Soc., 1273 (1954). Stirring was continued for 2 hours further at −20°. The temperature was allowed to reach 0° C. and the mixture was kept at this temperature for 20 minutes. There was then added 100 cc. of aqueous saturated ammonium chloride solution followed by 30 cc. of aqueous concentrated sodium acetate solution, extracted with ethyl acetate and the organic solution washed to neutral, dried over anhydrous sodium sulfate and evaporated to dryness under reduced pressure. There was thus obtained 17α-ethinyl-6β-trifluoromethyl-androstane-3β,5α,17β-triol.

A solution of 3 g. of the crude triol in 150 cc. of acetone was cooled to 0° C. and treated with an 8 N solution of chromium trioxide which was prepared by mixing 2.6 g. of chromium trioxide with 2.3 cc. of concentrated sulfuric acid and diluting with water to 10 cc. The reagent was added dropwise to the stirred solution in the course of approximately 5 minutes, while the temperature was maintained around 5° C. When the yellow color persisted in the acetone solution, the mixture was poured into water, the precipitate collected and washed well with water, thus affording 17α-ethinyl-6β-trifluoromethyl-androstane-5α,17β-diol-3-one.

A solution of 2.5 g. of the above compound in 30 cc. of dry pyridine was cooled to −10° C. and treated with 3 cc. of thionyl chloride taking care that the temperature of the mixture did not rise over 0° C. It was then allowed to stand for 5 minutes at this temperature. Ice-water was added and the crystalline precipitate was filtered, washed and dried. Crystallization from methylene chloride-ether gave 17α-ethinyl-6β-trifluoromethyl-$\Delta^4$-androsten-17β-ol-3-one.

*Example II*

A solution of 2 g. of the 17α-ethinyl-6β-trifluoromethyl-$\Delta^4$-androsten-17β-ol-3-one in 120 cc. of benzene was treated with 2 cc. of propionic anhydride and 1 g. of p-toluenesulfonic acid; the mixture was kept at room temperature for 48 hours, washed well with water, sodium carbonate solution and water to neutral, dried over anhydrous sodium sulfate and evaporated to dryness; by chromatography of the residue on neutral alumina and recrystallization of the solid eluates from acetone-hexane, there was obtained the 17-propionate of 17α-ethinyl-6α-trifluoromethyl-$\Delta^4$-androsten-17β-ol-3-one.

A solution of 1 g. of the above compound in 50 cc. of ethyl acetate was stirred under an atmosphere of hydrogen, at room temperature and atmospheric pressure in the presence of 200 mg. of 10% palladium-charcoal as catalyst which had been previously reduced in 10 cc. of ethyl acetate. After the equivalent of one mol of hydrogen had been absorbed the solution was filtered and evaporated to dryness. Crystallization from acetone-hexane afforded the 17-propionate of 17α-ethinyl-6α-trifluoromethyl-androstan-17β-ol-3-one.

0.5 g. of the latter compound in 30 cc. of methanol was treated with a solution of 350 mg. of sodium borohydride in 3 cc. of water. After keeping the mixture for 3 hours at room temperature, it was treated with 0.3 cc. of acetic acid and diluted with salt water, the precipitate was collected, washed with water and crystallized from acetone-hexane, thus producing 17α-ethinyl-6α-trifluoromethyl-androstan-3β,17β-diol-17-propionate. Conventional esterification with acetic anhydride in pyridine solution gave 17α-ethinyl-6α-trifluoromethyl-androstan-3β,17β - diol - 3-acetate 17-propionate.

*Example III*

In accordance with the method of Example I, 5 g. of 17α-ethyl-5α,6α-oxido-19-nor-androstan-3β,17β-diol were treated with trifluoromethyl-magnesium iodide, and the resulting 6β-trifluoromethyl-5α-hydroxy derivative was oxidized with 8 N chromic acid solution, thus producing 17α-ethyl-6β-trifluoromethyl-19-nor - androstane - 3α,17β-diol-3-one.

A solution of 1 g. of the latter compound in 100 cc. of methanol and 50 cc. of 1 N aqueous potassium hydroxide solution was allowed to stand at room temperature under a nitrogen atmosphere for 24 hours. The solution was then concentrated without heating to one-third of its volume, water and ice were added and the crystalline precipitate filtered, washed and dried, yielding 17α-ethyl-6α-trifluoromethyl-19-nor-Δ⁴-androsten-17β-ol - 3 - one. Recrystallizations from aqueous acetone gave the pure compound.

A solution of 1 g. of the above compound in 20 cc. of a mixture of anhydrous dioxane-ether 1:1 was added in a steady stream to a solution of 100 mg. of lithium in 100 cc. of anhydrous liquid ammonia with vigorous stirring. At the end of the addition the blue color was discharged by the rapid addition of 5 g. of ammonium chloride and the ammonia allowed to evaporate. The product was extracted with ether, washed with water, dried over anhydrous sodium sulfate and the ether solution was evaporated to afford a gum which was chromatographed on 50 parts of alumina. Elution with benzene-ether afforded the 3-keto-5-allo derivative, namely, 17α-ethyl-6α-trifluoromethyl-19-nor-androstane-17β-ol-3-one.

A solution of 200 mg. of sodium borohydride in 5 cc. of water was added to an ice-cooled solution of 1 g. of the latter compound in 50 cc. of tetrahydrofuran and the mixture was allowed to stand for 16 hours at room temperature. The excess of reagent was decomposed by addition of acetic acid, the solution was concentrated to a small volume in vacuo and diluted with water. The product was extracted with ethyl acetate and the extract was washed with water, dried and evaporated. The solid residue was purified by crystallization from acetone-hexane to give 17α-ethyl-6α-trifluoromethyl-19-nor-androstane-3β,17β-diol.

A solution of 500 mg. of the latter compound in 25 cc. of benzene was treated with 2 cc. of acetic anhydride and 250 mg. of p-toluenesulfonic acid, and the mixture allowed to stand at room temperature for 48 hours; it was then washed with 10% sodium carbonate solution and water, dried over anhydrous sodium sulfate and evaporated to dryness. Crystallization from chloroform-methanol gave the pure diacetate of 17α-ethyl-6α-trifluoromethyl-19-nor-androstane-3β,17β-diol.

A solution of 0.5 g. of the above diacetate in 30 cc. of methanol was treated under an atmosphere of nitrogen with 0.2 g. of potassium hydroxide in 2 cc. of water. The mixture was kept for 2 hours at room temperature and then neutralized with acetic acid and concentrated to one-third of its volume; dilution with water and filtration of the precipitate yielded 17α-ethyl-6α-trifluoromethyl-19-nor - androstane - 3β,17β - diol-17-monoacetate. Conventional reaction of this compound with cyclopropionic anhydride in pyridine solution gave 17α-ethyl-6α-trifluoromethyl - 19 - nor - androstane - 3β,17β - diol - 3 - cyclopentylpropionate 17-acetate.

*Example IV*

By following the method of Example I, but using the 5α,6α - oxido - 17α - ethinyl -19 - nor - androstan - 3β,17β-diol as starting material, there were obtained successively the 17α-ethinyl-6β-trifluoromethyl-19-nor-androstane-3β, 5α,17β-triol, 17α-ethinyl-6β-trifluoromethyl-19-nor-androstane-5α,17β-diol-3-one and 17α-ethinyl-6β-trifluoromethyl-19-nor-Δ⁴-androsten-17β-ol-3-one.

Hydrogenation of 2 g. of the above compound in ethyl acetate solution and using 10% palladium on charcoal as catalyst, in accordance with the method of Example II, gave 17α - ethinyl - 6β - trifluoromethyl - 19 - nor - androstan-17β-ol-3-one.

500 mg. of the above compound were treated with sodium borohydride in aqueous methanol solution, by following the method of Example II, thus producing 17α-ethinyl - 6β - trifluoromethyl - 19 - nor - androstane - 3β, 17β-diol. Acetylation of this compound with acetic anhydride in pyridine solution, in a conventional manner, gave 17α - ethinyl - 6β - trifluoromethyl - 19 - nor - androstane-3β,17β-diol-3-monoacetate.

*Example V*

By applying the method of Example I, 5 g. of 17α-methyl - 5α,6α - oxido - androstane - 3β,17β - diol, described in U.S.P. 2,838,500 were treated with trifluoromethylmagnesium iodide and the resulting 6β-trifluoromethyl-5-hydroxy derivative was oxidized with 8 N chromic acid solution, thus affording 17α-methyl-6β-trifluoromethylandrostane-5α,17β-diol-3-one; treatment of this compound with methanolic potassium hydroxide, followed by reduction with lithium in liquid ammonia, in accordance with the method of Example III, gave 17α-methyl-6α-trifluoromethyl-Δ⁴-androsten-17β-ol-3-one.

*Example VI*

In accordance with the method of Example I, 17α-vinyl-5α,6α - oxido - 19 - nor - androstan - 3β,17β - diol was converted into 17α - vinyl - 6β - trifluoromethyl - Δ⁴ - 19 - nor-androsten-17β-ol-3-one.

Reduction of this compound with lithium in liquid ammonia followed by sodium borohydride reduction in accordance with the method of Example III, gave 17α-vinyl-6β-trifluoromethyl-19-nor-androstane-3β,17β-diol.

A mixture of 1 g. of the above compound, 4 cc. of pyridine and 4 cc. of benzoyl-chloride was heated on the steam bath for 4 hours. It was then poured into ice water, the precipitate was collected, dried and recrystallized from acetone ether; there was thus obtained 17α-vinyl - 6β - trifluoromethyl - 19 - nor - androstan - 3β,17β-diol-3-benzoate. Subsequent treatment with 1 cc. of caproic anhydride and 250 mg. of p-toluenesulfonic acid in 25 cc. of benzene, overnight at room temperature, produced 17α - vinyl - 6α - trifluoromethyl - 19 - nor - androstan-3β,17β-diol-3-benzoate-17-caproate.

*Example VII*

A mixture of 2 g. of 17α-ethyl-6α-trifluoromethyl-19-nor-Δ⁴-androsten-17β-ol-3-one, obtained as described in Example III, 100 cc. of terbutanol and 4 g. of chloranil was refluxed for 8 hours. The mixture was cooled, the excess of chloranil filtered and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with alumina, gave 17α-ethyl-6-trifluoromethyl-19-nor-$\Delta^{4,6}$-androstadien-17β-ol-3-one. Treatment of the above compound in benzenic solution with acetic anhydride in the presence of p-toluenesulfonic acid, in accordance with the method of Example III, gave the corresponding 17-acetate.

Example VIII

A stirred mixture of 3.4 g. of 6β-trifluoromethyl-17α-ethinyl-testosterone, obtained as described in Example I, 160 cc. of anhydrous t-butyl alcohol, 0.55 cc. of pyridine and 1.7 g. of selenium dioxide was refluxed for 18 hours, under an atmosphere of nitrogen; the mixture was cooled and filtered through Celite, and the insoluble material washed well with hot ethyl acetate. The solution was evaporated to dryness under reduced pressure and the residue purified by chromatography on 50 parts of neutral alumina, thus yielding the pure 6α-trifluoromethyl-17α-ethinyl-$\Delta^{1,4}$-androstadien-17β-ol-3-one.

Chloranil dehydrogenation of the above compound in accordance with the method of Example VII, gave 6-trifluoromethyl-17α-ethinyl-$\Delta^{1,4,6}$-androstatrien-17β-ol-3-one. In a similar manner, 6α-trifluoromethyl-17α-methyl-testosterone obtained as described in Example V gave 6α-trifluoromethyl-17α-methyl-$\Delta^{1,4}$-androstadien-17β-ol-3-one and 6-trifluoromethyl-$\Delta^{1,4,6}$-androstatrien-17β-ol-3-one.

Example IX

By applying the dehydrogenation method of Example VII, 6β-trifluoromethyl-17α-ethinyl-19-nor-testosterone and 6β-trifluoromethyl-17α-vinyl-19-nor-testosterone were treated with chloranyl in t-butyl alcohol, to produce respectively 6-trifluoromethyl-17α-ethinyl-$\Delta^{4,6}$-19-nor-androstadien-17β-ol-3-one and 6-trifluoromethyl-17α-vinyl-$\Delta^{4,6}$-19-nor-androstadien-17β-ol-3-one.

Example X

A solution of 10 g. of $\Delta^5$-androsten-3β,17β-diol-17-monobenzoate in 250 cc. of chloroform was treated with monoperphthalic acid in ethereal solution in accordance with Preparation I, to produce 5α,6α-epoxidoandrostane-3β,17β-diol 17-monobenzoate. By following the method of Example I, the above compound was treated with trifluoromethyl magnesium iodide, and the resulting 6β-trifluoromethyl-androstan-3β,5α,17β-triol-17-monobenzoate was oxidized with 8 N chromic acid to produce 6β-trifluoromethyl-androstane-5α,17β-diol-one 17-monobenzoate. Upon treatment with methanolic potassium hydroxide solution, in accordance with the method of Example III, there was obtained 6α-trifluoromethyl-testosterone.

Conventional esterification of the above compound with the corresponding acid anhydrides or chlorides in pyridine solution gave the acetate, propionate, caproate and cyclopentylpropionate of 6α-trifluoromethyltestosterone.

Example XI

To a solution of 10 g. of $\Delta^5$-androsten-3β,17β-diol 17-monobenzoate in 150 cc. of benzene was added 20 cc. of dihydropyran and about 10 cc. were distilled to remove moisture, the solution was cooled and then treated with 200 mg. of p-toluenesulfonic acid and the reaction mixture allowed to stand at room temperature for 4 days. The solution was washed with sodium carbonate solution and water, dried over anhydrous sodium sulfate and evaporated to dryness. Crystallization from acetone-hexane gave the 3-tetrahydropyranyloxy derivative.

A stream of diborane was passed through a solution of 4 g. of the above compound in 50 cc. of tetrahydrofuran for 1 hour. (After 20 minutes the solution became warm and then the temperature slowly subsided.) The excess of diborane was decomposed by careful addition of water. Then 500 cc. of water was added and the formed precipitate was filtered, washed and dried, thus giving 3,5 g. of the organoboron compound.

This material was dissolved in 100 cc. of methanol and treated with 1.8 g. of sodium hydroxide previously dissolved in 5 cc. of water and 9 cc. of hydrogen peroxide, stirring and keeping the temperature around 15° C. The mixture was stirred for 2 hours; after this time, the precipitated product was filtered, washed and dried, thus affording 3β-tetrahydropyranyloxy-17β-benzoyloxy-androstan-6α-ol.

A solution of 1 g. of the above compound in 20 cc. of pyridine was added to a mixture of 1 g. of chromium trioxide in 20 cc. of pyridine. The reaction mixture was kept at room temperature overnight. It was then diluted with ethyl acetate, filtered through Celite and the filtrate washed well with water, dried and evaporated almost to dryness, until crystallization started; there was thus obtained 3-tetrahydropyranyloxy-17β-benzoyloxy-androstan-6-one.

Example XII

A suspension of 2.9 g. of triphenylphosphonium methyl bromide in 50 cc. of anhydrous ether was treated under an atmosphere of nitrogen, with 8 cc. of 1 N ethereal solution of butyl lithium and the mixture was stirred for 2 hours at room temperature. A solution of the 6-keto-steroid obtained in the previous experiment was then added dropwise, in the course of 15 minutes and with stirring. The reaction mixture was stirred for 6 hours further and let stand at room temperature overnight. The ether was displaced with dry tetrahydrofuran by distillation and then refluxed for 8 hours. It was cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave the 6-methylene derivative of 3β-tetrahydropyranyloxy-17β-benzoyloxy-androstane.

1 g. of the above compound was treated with diborane, in accordance with the method of Example XI, to give 0.5 g. of the 3-tetrahydropyranyl ether of 6β-hydroxymethyl-androstan-3β,17β-diol-17-benzoate.

A solution of 1 g. of the above compound in 5 cc. of pyridine was treated with 0.5 g. of mesyl chloride and kept at room temperature for 24 hours, it was then diluted with water and the precipitate was separated by filtration, thus giving 0.73 g. of the corresponding mesylate.

A stirred suspension of 10 g. of potassium fluoride in 50 cc. of dimethyl formamide was heated to boiling and then a solution of 2 g. of the above mesylate in 10 cc. of dimethyl formamide was added. The mixture was refluxed for 5 hours, cooled and poured into water; the formed precipitate was filtered and crystallized to give 0.4 g. of the 3-tetrahydropyranyl ether of 6β-monofluoromethyl-androstane-3β,17β-diol-17-banzoate.

The latter compound was dissolved in 8 cc. of acetone, 2 drops of concentrated hydrochloric acid were added and the mixture kept at room temperature for 1 hour, poured into ice salt water, extracted with methylene chloride and the organic extract was washed with sodium bicarbonate solution and water until neutral, dried over anhydrous sodium sulfate and evaporated to dryness. Crystallization from acetone-ether gave 6β-monofluoromethyl-androstane-3β,17β-diol-17-monobenzoate. Oxidation of this compound with 8 N chromic acid solution, in accordance with the method of Example I, gave 6β-monofluoromethyl-androstan-17β-ol-3-one benzoate.

Example XIII

A solution of 0.75 g. of bromine (2 equivalents) in 15 cc. of glacial acetic acid was added dropwise, with stirring to a solution of 1 g. of 6β-monofluoromethyl-androstan-17β-ol-3-one benzoate in 25 cc. of acetic acid containing 5 drops of 4 N hydrogen bromide in acetic acid. After five hours at room temperature, the mixture was poured into ice water and the precipitated 2,4-dibromo derivative was collected, washed well with water, and dried. The dried material was refluxed for 14 hours with 2 g. of sodium iodide in 40 cc. of methyl ethyl ketone and then kept at room temperature for an additional 12 hours. After dilution with water, the product was extracted with ether, washed with sodium thiosulfate solution and water, and the ether was removed under reduced pressure, thus giving 2-iodo-6α-monofluoromethyl-Δ⁴-androstan-17β-ol-3-one 17-benzoate.

The above crude compound was refluxed for 30 minutes with 10 cc. of collidine; after the usual work-up including chromatography, there was obtained 6α-monofluoromethyl-Δ⁴-androsten-17β-ol-3-one benzoate.

A solution of 500 mg. of the above compound in 25 cc. of 2% methanolic potassium hydroxide solution was refluxed for 2 hours and then neutralized with acetic acid, concentrated under vacuo to one-third of its volume, poured into ice salt water; the precipitate was collected and washed with water, dried and recrystallized from acetone-hexane, thus producing 6α-monofluoromethyl-Δ⁴-testosterone.

*Example XIV*

2 g. of 2,4-dibromo-6α-monofluoromethyl-androstan-17β-ol-3-one benzoate, obtained as described in Example XIII was dissolved in 10 cc. of dimethylformamide and added to a boiling suspension of 2 g. of calcium carbonate in 40 cc. of dimethylformamide. The mixture was refluxed, with stirring, for 20 minutes, filtered through Celite and the filtrate diluted with ice salt water, the formed precipitate was collected, washed well with water and dried. Upon treatment of the above crude compound with methanolic potassium hydroxide solution, in accordance with the method of Example XIII, there was obtained 6α-monofluoromethyl-Δ¹,⁴-androstadien-17β-ol-3-one.

Esterification of the above compound with acid anhydrides or chlorides in benzene solution in the presence of p-toluenesulfonic acid gave the corresponding 17-acetate, propionate, cyclopentylpropionate and caproate.

*Example XV*

A solution of 5 g. of 6α-monofluoromethyl-testosterone in 100 cc. of acetone was oxidized with an 8 N solution of chromium trioxide in accordance with the method of Example I, thus giving 6α-monofluoromethyl-Δ⁴-androsten-3,17-dione.

A suspension of 5 g. of the above compound in 40 cc. of peroxide-free dioxane and 5 cc. of freshly distilled ethyl orthoformate was treated with 150 m. of p-toluenesulfonic acid and the mixture was stirred for 45 minutes (within 10 minutes the solid came into solution). 0.8 cc. of pyridine was added and then poured into ice salt water, the precipitate was collected and washed with water containing a few drops of pyridine, there was thus obtained 3-ethoxy-6-monofluoromethyl-Δ³,⁵-androstadien-17-one.

2 g. of the above enol ether were dissolved in 50 cc. of thiophene-free anhydrous benzene and treated with 20 cc. of a 3 N solution of methyl magnesium bromide. The mixture was refluxed for 3 hours under anhydrous conditions, cooled and then poured into 500 cc. of water. It was acidified with concentrated hydrochloric acid, the organic layer was separated, and the water reextracted several times with benzene, the organic extracts were combined and washed with sodium carbonate solution and water until neutral, dried over anhydrous sodium sulfate and evaporated to dryness. Crystallization from acetone-hexane gave 6α-monofluoromethyl-17α-methyl-testosterone.

Substituting the methyl magnesium bromide for ethyl, vinyl or ethinyl magnesium bromide there were obtained the respective 17-substituted derivatives, namely, 6α-monofluoromethyl-17α-ethyl-testosterone,
6α-monofluoromethyl-17α-vinyl-testosterone and
6α-monofluoromethyl-17α-ethinyl-testosterone.

*Example XVI*

To a solution of 2 g. of 3-ethoxy-6-monofluoromethyl-Δ³,⁵-androstadien-17-one in 250 cc. of absolute ether was added little by little, a solution of 10 molar equivalents of ethyl lithium in 50 cc. of ether with mechanical stirring and under an atmosphere of nitrogen.

The mixture was then stirred for 48 hours at room temperature and under an atmosphere of nitrogen; after pouring into water, the mixture acidified with hydrochloric acid, stirring vigorously for 1 hour. The ether layer was separated, washed with water to neutral, dried over anhydrous sodium sulfate, filtered and the ether was evaporated to dryness. Recrystallization of the residue from acetone-hexane yielded 6α-monofluoromethyl-17α-ethyl-testosterone identical with that obtained in Example XV. Esterification with cyclopentylpropionic anhydride in benzene solution and in the presence of p-toluenesulfonic acid gave the corresponding cyclopentylproprionate.

*Example XVII*

A solution of 1 g. of potassium metal in 50 cc. of t-butanol was prepared under an atmosphere of nitrogen, cooled to 0° C. and treated with a cold solution of 1 g. of 3-ethoxy-6-monofluoromethyl-Δ³,⁵-androstadien-17-one, little by little, under an atmosphere of nitrogen, at 0° C. and under continuous stirring. The nitrogen was then substituted by dry purified acetylene and a stream of this gas introduced into the mixture for 40 hours. The solution was then poured into 200 cc. of dilute hydrochloric acid, stirred for 1 hour at room temperature and the organic solvents removed by steam distillation. The residue was cooled, the solid collected and crystallized from acetone-hexane, thus furnishing 6α-monofluoromethyl-17α-ethinyl-testosterone.

A solution of 500 mg. of the above compound in 10 cc. of pyridine containing 100 mg. of pre-reduced palladium on calcium carbonate was hydrogenated at room temperature until the equivalent of 1 mol of hydrogen had been absorbed; the catalyst was removed by filtration; the pyridine was evaporated under reduced pressure and the residue was triturated with 20 cc. of 1% hydrochloric acid; the product was extracted with ethyl acetate and the extract was washed with water, dried over anhydrous sodium sulfate and evaporated to dryness. By chromatography on neutral alumina there was obtained 6α-monofluoromethyl-17α-vinyl-testosterone, identical with the compound obtained in Example XV.

Treatment of the above compound with the corresponding acid anhydrides or chlorides in benzene solution and in the presence of p-toluenesulfonic acid gave the corresponding 17-caproate, 17-propionate and 17-hexahydrobenzoate of 6α-monofluoromethyl-17α-vinyl-testosterone.

*Example XVIII*

2 g. of 6α - monofluoromethyl - 17α - ethyltestosterone were converted into the corresponding acetate in accordance with the esterification method of Example III. The above compound was treated with selenium dioxide in t-butanol solution and in the presence of pyridine, by applying the method of Example VIII, giving 6α-monofluoromethyl - 17α - ethyl - Δ¹,⁴-androstadien-17β-ol-3-one acetate.

A mixture of 1 g. of the latter compound, 2 g. of chloranil, 15 cc. of ethyl acetate and 5 cc. of acetic acid was refluxed under an atmosphere of nitrogen for 96 hours. It was then cooled, washed with a cold aqueous 10% sodium hydroxide solution until the washings were colorless, dried over anhydrous sodium sulfate and the ethyl acetate was evaporated. Chromatography of the residue on neutral alumina gave the pure 6-monofluoromethyl-17α-ethyl-Δ¹,⁴,⁶-androstatrien-17β-ol-3-one acetate.

Example XIX

A mixture of 1.5 g. of 6α-monofluoromethyl-17α-ethinyl-testosterone, 3 g. of chloranil and 75 cc. of t-butyl alcohol was refluxed for 8 hours; after the usual work-up there was obtained 6-monofluoromethyl-17α-ethinyl-$\Delta^{4,6}$-androstadien-17β-ol-3-one. Selenium dioxide oxidation of the above compound, in accordance with the method of Example VIII gave 6-monofluoromethyl-17α-ethinyl-$\Delta^{1,4,6}$-androstatrien-17β-ol-3-one.

Example XX

By following the methods of Examples XI and XII, $\Delta^5$-19-nor-androsten-3β,17β-diol-17-monobenzoate, described by R. Villotti et al. in J. Am. Chem. Soc. 81 4568 (1959) was converted into the benzoate of 6β-monofluoromethyl-19-nor-androstan-17β-ol-3-one.

Bromination of the above compound in acetic acid followed by treatment with sodium iodide in methyl ethyl ketone and deiodination with collidine, as described in Example XIII, afforded 6α-monofluoromethyl-19-nor-testosterone benzoate.

Example XXI

By following the method of Example XV, 5 g. of 6α-monofluoromethyl-19-nor-testosterone was oxidized with 8 N solution of chromic acid, and the resulting diketo compound converted into the enol ether, i.e. 3-ethoxy-6-monofluoromethyl-19-nor-$\Delta^{3,5}$-androstadien-17-one.

Further treatment with methyl magnesium bromide followed by acid hydrolysis gave 6α-monofluoromethyl-17α-methyl-testosterone.

1 g. of the above compound was converted into the corresponding propionate by following the method of Example II.

Upon treatment of this compound with chloranil in t-butanol, according to the method of Example VII, there was obtained the propionate of 6-monofluoromethyl-17α-methyl-$\Delta^{4,6}$-androstadien-17β-ol-3-one.

Example XXII

By following the method of Example XVII, 2 g. of 3-ethoxy-6-monofluoromethyl-$\Delta^{3,5}$-19-nor-androstadien-17-one was treated with potassium acetylide, thus giving 6α-monofluoromethyl-17α-ethinyl-19-nor-testosterone.

500 mg. of the above compound were partially hydrogenated in pyridine solution using 10% palladium on calcium carbonate as catalyst, in accordance with the method of Example XVII, to produce 6α-monofluoromethyl-17α-vinyl-19-nor-testosterone.

Esterification of the 17α-ethinyl and 17α-vinyl-derivatives of 6α-monofluoromethyl-testosterone with acid anhydrides or chlorides in benzene solution and in the presence of p-toluenesulfonic acid gave the corresponding acetates, propionates and cyclopentylpropionates of 6α-monofluoromethyl-17α-ethinyl-19-nor-testosterone and 6α-monofluoromethyl-17α-vinyl-19-nor-testosterone.

Example XXIII 1 g. of 3-ethoxy-6-monofluoromethyl-$\Delta^{3,5}$-19-nor-androstadien-17-one was treated with ethyl lithium in ethereal solution, in accordance with the method of Example XVI, to produce 6α-monofluoromethyl-17α-ethyl-19-nor-testosterone.

Upon treatment of 500 mg. of this compound with chloranil in mixture with ethyl acetate and acetic acid, by applying the method of Example XVIII, there was obtained 6-monofluoromethyl-17α-ethyl-$\Delta^{4,6}$-19-nor-androstadien-17β-ol-3-one.

Example XXIV

A suspension of 10 g. of the 3-mono acetate of 17α-ethyl-$\Delta^5$-androstene-3β,17β-diol in 100 cc. of dioxane was treated with 12 cc. of 0.46 N perchloric acid and then with 4 g. of N-bromoacetamide; the N-bromoacetamide was added little by little, with stirring, in the course of 1 hour, in the dark and maintaining the temperature around 15° C. The mixture was stirred for 1 hour further in the dark at room temperature; it was then decolorized by the addition of 10% aqueous sodium bisulfite solution, 1 l. of water was added and the product was extracted with methylene chloride; the extract was washed with water, dried over anhydrous sodium sulfate and the solvent was evaporated under reduced pressure at room temperature. The residue was crystallized from acetone-hexane to afford 3-mono acetate of 5α-bromo-17α-ethyl-androstane-3β,6β,17β-triol.

There was prepared 100 cc. of an 8 N solution of chormic acid from 26.7 g. of chromium trioxide, 23 cc. of concentrated sulfuric acid and distilled water. A solution of 10 g. of the 5α-bromo compound in 100 cc. of acetone was cooled to 0° C. and treated with the 8 N solution of chromic acid until the characteristic color of chromium trioxide persisted in the mixture. The 8 N solution of chromic acid was added in a slow stream, under an atmosphere of nitrogen, with stirring and at 0° C. The mixture was then stirred at 0° C. under an atmosphere of nitrogen for 2 minutes further, poured into ice water and the precipitate was collected by filtration, washed with water and dried under vacuum, thus affording the 3-mono-acetate of 5α-bromo-17α-ethyl-androstane-3β,17β-diol-6-one.

A mixture of the above compound, 10 g. of zinc dust and 250 cc. of glacial acetic acid was refluxed for 2 hours, at the end of which it was filtered through Celite under an atmosphere of ntrogen and the filtrate was concentrated to a small volume under reduced pressure; after cooling it was diluted with ice water and the precipitate of the 3-mono acetate of 17α-ethyl-androstane-3β,17β-diol-6-one was collected by filtration. Recrystallization from acetone-hexane gave the pure compound.

Example XXV

A suspension of 2.2 g. of triphenyl(methoxymethyl)-phosphonium chloride in 50 cc. of anhydrous ether was treated, under an atmosphere of nitrogen with 6.8 cc. of 1 N ethereal solution of phenyl-lithium and the mixture was stirred for 1 hour at room temperature and then added dropwise a solution of 1 g. of the 3-monoacetate of 17α-ethyl-androstane-3β,17β-diol-6-one in 100 cc. of anhydrous ether (in 30 minutes). The reaction mixture was stirred overnight, the ether was then removed by distillation and during this process 150 cc. of tetrahydrofuran was added. When all the ether was distilled, the mixture was refluxed for 6 hours and concentrated under vacuo to half its volume. After dilution with water the product was extracted with methylene chloride, the organic extract washed to neutral, dried over anhydrous sodium sulfate and evaporated to dryness. The resulting oily material was chromatographed. Recrystallization of the solid eluates afforded the 6-hydroxymethylene-methyl-ether of 17α-ethyl-androstan-3β,17β-diol-3-monacetate.

A solution of 1 g. of the above compound in 50 cc. of ether was treated with 50 cc. of ether saturated with perchloric acid and kept at room temperature for 30 minutes. The solution was then washed with 5% sodium bicarbonate solution and water, dried over anhydrous sodium sulfate and evaporated to dryness. Crystallization of the residue from acetone-hexane gave the 6-aldehyde of 17α-ethyl-androstan-3β,17β-diol 3-monoacetate.

A solution of 500 mg. of the above aldehyde in 25 cc. of benzene was kept at room temperature in a sealed tube with 2 molar equivalents of sulfur tetrafluoride during 72 hours. The reaction mixture was cooled and the contents of the tube poured carefully into ice water. An excess of sodium bicarbonate was added and the product was extracted with methylene chloride. The extract was washed with water to neutral, dried and evaporated to dryness. After chromatography and crystallization of the solid fractions from acetone-hexane, there was obtained 6α-difluoromethyl-17α-ethyl-androstane-3β,17β-diol 3-acetate.

Saponification of the 3-acetate with methanolic potassium hydroxide gave the free compound.

*Example XXVI*

1 g. of 6α-difluoromethyl-17α-ethyl-androstan-3β,17β-diol was treated with an 8 N solution of chromium trioxide in accordance with the method of Example I, thus producing 6α - difluoromethyl-17α-ethyl-androstan-17β-ol-3-one. Bromination of this compound in acetic acid followed by treatment with sodium iodide in methyl ethyl ketone, in accordance with the method of Example XIII, gave 2 - iodo - 6α-difluoromethyl-17α-ethyl-Δ⁴-androsten-17β-ol-3-one. This product, without further purification was treated in an atmosphere of carbon dioxide with 20 cc. of a solution of chromous chloride prepared as described by Rosenkranz et al. in J. Am. Chem. Soc. 72, 4077 (1950). After 20 minutes at room temperature, water was added, the mixture was extracted with ether, washed with sodium bicarbonate and water until neutral, dried, and concentrated to a small volume until crystallization started. The precipitate was filtered, yielding 6α-difluoromethyl-17α-ethyl-testosterone.

Esterification of the above compound with the corresponding acid anhydrides or chlorides in benzene solution and in the presence of p-toluenesulfonic acid, gave the 17-acetate, propionate, caproate and cyclopentylpropionate of 6α-difluoromethyl-17α-ethyl-testosterone.

*Example XXVII*

By following the methods of Examples XXIV and XXV, the 3-monoacetate of 17α-ethinyl-Δ⁵-androsten-3β,17β-diol was converted into 6α-difluoromethyl-17α-ethinyl-androstane-3β,17β-diol. Upon oxidation with 8 N chromium trioxide there was obtained 6α-difluoromethyl-17α-ethinyl-androstan-17β-ol-3-one.

A mixture of 1 g. of the above compound, 40 cc. of dioxane and 500 mg. of 2,3-dichloro-5,6-dicyano-1,4-benzoquinone was refluxed for 18 hours, it was then cooled, the 2,3 - dichloro-5,6-dicyano-1,4-benzohydroquinone formed during the reaction filtered off and the filtrate evaporated to dryness. Chromatography of the residue gave 6α-difluoromethyl-17α-ethinyl-Δ¹,⁴-androstadien-17β-ol-3-one.

The same compound was also obtained by incubation for 7 days of 6α-difluoromethyl-17α-ethinyl-androstan-17β-ol-3-one with *Fusarium solani*, in accordance with the method described in U.S. Patent 2,904,472.

*Example XXVIII*

A solution of 1 g. of 6α-difluoromethyl-17α-ethinyl-Δ¹,⁴-androstadien-17β-ol-3-one in 25 cc. of pyridine containing 200 mg. of pre-reduced palladium on calcium carbonate was hydrogenated at room temperature until the equivalent of 1 mol of hydrogen had been absorbed; the catalyst was removed by filtration; the pyridine was evaporated under reduced pressure and the residue was triturated with 20 cc. of 1% hydrochloric acid; the product was extracted with ethyl acetate and the extract was washed with water, dried over anhydrous sodium sulfate and evaporated until crystallization started; there was thus obtained 6α-difluoromethyl - 17α-vinyl-Δ¹,⁴-androstadien-17β-ol-3-one. Upon treatment with propionic anhydride in benzene solution and in the presence of p-toluenesulfonic acid there was obtained the corresponding propionate.

*Example XXIX*

5 g. of 17α-ethyl-19-nor-Δ⁵-androsten-3β,17β-diol, described by J. Iriarte et al. in J. Am. Chem. Soc. 81, 436 (1959) was converted into the corresponding 3-monoacetate by treatment with acetic anhydride in pyridine solution.

By following the methods of Examples XXIV and XXV, the above compound was converted into 6α-difluoromethyl - 17α-methyl-19-nor-androstane-3β,17β-diol. Upon oxidation with 8 N chromium trioxide in acetone solution according to the method of Example I, there was obtained 6α-difluoromethyl-17α-methyl-19-nor-androstan-17β-ol-3-one. Bromination of this compound in acetic acid, followed by treatment with sodium iodide in methyl ethyl ketone, in accordance with the method of Example XIII, gave 2 - iodo-6α-difluoromethyl-17α-methyl-19-nor-Δ⁴-androsten-17β-ol-3-one. Further deiodization of this compound with chromous chloride in accordance with the method of Example XXVIII, gave 6α-difluoromethyl-17α-methyl-19-nor-testosterone.

A benzene solution of 1 g. of the above compound was treated with acetic anhydride in the presence of p-toluenesulfonic acid, thus producing the corresponding acetate.

500 mg. of the acetate of 6α-difluoromethyl-17α-methyl-19-nor-testosterone were treated with chloranil in mixture with ethyl acetate and acetic acid, in accordance with the method of Example XVIII, thus producing 6-difluoromethyl - 17α - methyl-19-nor-Δ⁴,⁶-androstadien-17β-ol-3-one acetate.

*Example XXX*

1 g. of 6α-difluoromethyl-17α-ethyl-2,4-dibromo-17α-ethyl-androstan-17β-ol-3-one was dehydrobrominated with calcium carbonate in dimethylformamide, according to the method of Example XIV, thus giving 6α-difluoromethyl - 17α - ethyl-Δ¹,⁴-androstadien-17β-ol-3-one. Upon treatment of this compound with acetic anhydride in benzene solution and in the presence of p-toluenesulfonic acid there was obtained the corresponding acetate.

*Example XXXI*

By applying the chloranil dehydrogenation method described in Example VII, 6α-difluoromethyl-17α-ethinyl-Δ¹,⁴ - androstadien-17β-ol-3-one, 6α-difluoromethyl-17α-vinyl-Δ¹,⁴-androstadien-17β-ol-3-one propionate were converted into the corresponding 6-dehydro derivatives, namely 6 - difluoromethyl-17α-ethinyl-Δ¹,⁴,⁶-androstatrien-17β-ol-3-one and 6-difluoromethyl-17α-vinyl-Δ¹,⁴,⁶-androstatrien-17β-ol-3-one propionate.

*Example XXXII*

By following the method of Example I, 5 g. of the 3-monoacetate of 17-ethyl-androstan-3β,17β-diol-6-one, obtained as described in Example XXIV were treated with trifluoromethyl magnesium iodide, in accordance with the method of Example I, but stirring the mixture at 0° C. for 6 hours. There was thus obtained 6α-trifluoromethyl-17α-ethyl-androstan-3β,6β,17β-triol. A solution of the above compound was dissolved in 15 cc. of pyridine and 15 cc. of acetic anhydride was heated on the steam bath for 1 hour; after the usual work-up the corresponding 3-monoacetate was obtained. Upon dehydration of the above compound with thionyl chloride in pyridine solution in accordance with the method of Example I, there was produced 6-trifluoromethyl-17α-ethyl-Δ⁵-androstene-3β,17β-diol 3-monoacetate.

A solution of 2 g. of the above compound in 20 cc. of methanol was treated, under an atmosphere of nitrogen with 500 mg. of potassium hydroxide dissolved in 1 cc. of water, and the mixture was kept at room temperature for 2 hours, diluted with water and the formed precipitate collected, washed with water and dried. Oxidation of the above compound with 8 N chromic acid in acetone solution, by following the method of Example I, gave 6-trifluoromethyl - 17α - ethyl-Δ⁵-androsten-17β-ol-3-one.

A solution of 1 g. of the above compound in 30 cc. of ethanol was treated at room temperature with 0.1 g. of oxalic acid in 1 cc. of water. The mixture was kept standing at room temperature for 16 hours and then poured into ice-salt water, extracted with methylene chloride, the organic extract washed with water, 10% sodium carbonate solution and water to neutral, dried over anhydrous sodium sulfate and evaporated to dryness. Chromatography of the residue on 50 times its weight of neutral alumina gave the pure 6α-trifluoromethyl-17α-ethyl-testosterone.

We claim:
1. A compound of the following formula:

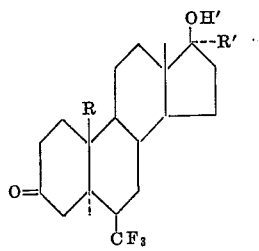

wherein R is selected from the group consisting of hydrogen and methyl and R" is selected from the group consisting of hydrogen and an aliphatic hydrocarbon group containing up to 8 carbon atoms.

2. A compound of the following formula:

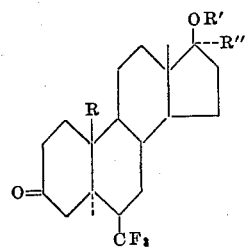

wherein R is selected from the group consisting of hydrogen and methyl; R' is selected from the group consisting of hydrogen and a hydrocarbon carboxylic acyl group of less than 12 carbon atoms and R" is selected from the group consisting of hydrogen and an aliphatic hydrocarbon group containing up to 8 carbon atoms.

3. A compound of the following formula:

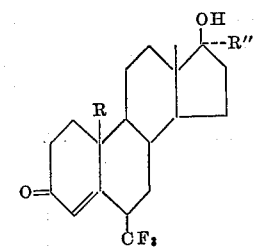

wherein R is selected from the group consisting of hydrogen and methyl; and R" is selected from the group consisting of hydrogen and an aliphatic hydrocarbon group containing up to 8 carbon atoms.

4. A compound of the following formula:

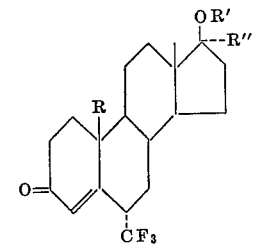

wherein R is selected from the group consisting of hydrogen and methyl; R' is selected from the group consisting of hydrogen and a hydrocarbon carboxylic acyl group of less than 12 carbon atoms and R" is selected from the group consisting of hydrogen and an aliphatic hydrocarbon group containing up to 8 carbon atoms.

5. 6α-trifluoromethyl-Δ⁴-androsten-17β-ol-3-one.
6. 6α-trifluoromethyl-17α-ethinyl - Δ⁴ - androsten - 17β-ol-3-one.
7. 6α-trifluoromethyl-17α-ethyl-19-nor - Δ⁴ - androsten-17β-ol-3-one.
8. 6α-trifluoromethyl-17α-vinyl-19-nor - Δ⁴ - androsten-17β-ol-3-one.

9. A compound of the following formula:

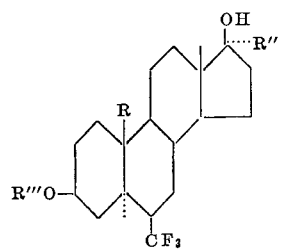

wherein R is selected from the group consisting of hydrogen and methyl; R" is selected from the group consisting of hydrogen and an aliphatic hydrocarbon group containing up to 8 carbon atoms; and R''' is selected from the group consisting of hydrogen and a hydrocarbon carboxylic acyl group of less than 12 carbon atoms.

10. A compound of the following formula:

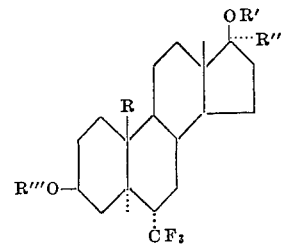

wherein R is selected from the group consisting of hydrogen and methyl; R' and R''' are each selected from the group consisting of hydrogen and a hydrocarbon carboxylic acyl group of less than 12 carbon atoms; and R" is selected from the group consisting of hydrogen and an aliphatic hydrocarbon group containing up to 8 carbon atoms.

11. A compound of the following formula:

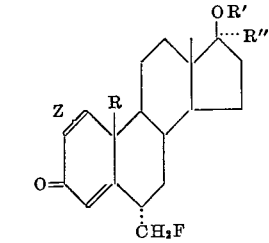

wherein R is selected from the group consisting of hydrogen and methyl; R' is selected from the group consisting of hydrogen and a hydrocarbon carboxylic acyl group of less than 12 carbon atoms; R" is selected from the group consisting of hydrogen and an aliphatic hydrocarbon group containing up to 8 carbon atoms; and Z is selected from the group consisting of a double bond between C-1 and C-2 and a saturated linkage between C-1 and C-2.

12. 6α-monofluoromethyl-Δ⁴-androsten-17β-ol-3-one.
13. 6α-monofluoromethyl - 17α - ethyl - Δ⁴ - androsten-17β-ol-3-one.
14. 6α-monofluoromethyl-17α-ethinyl-19-nor - Δ⁴ - androstene-17β-ol-3-one.

15. A compound of the following formula:

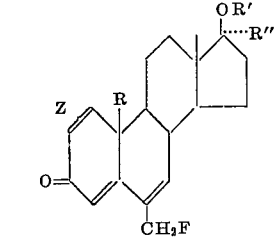

wherein R is selected from the group consisting of hydrogen and methyl; R' is selected from the group consisting of hydrogen and a hydrocarbon carboxylic acyl group of less than 12 carbon atoms; R″ is selected from the group consisting of hydrogen and an aliphatic hydrocarbon group containing up to 8 carbon atoms; and Z is selected from the group consisting of a double bond between C–1 and C–2 and a saturated linkage between C–1 and C–2.

16. A compound of the following formula:

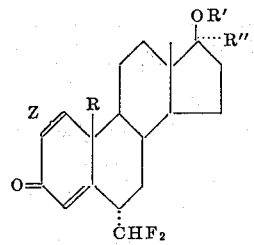

wherein R is selected from the group consisting of hydrogen and methyl; R′ is selected from the group consisting of hydrogen and a hydrocarbon carboxylic acyl group of less than 12 carbon atoms; R″ is selected from the group consisting of hydrogen and an aliphatic hydrocarbon group containing up to 8 carbon atoms; and Z is selected from the group consisting of a double bond between C–1 and C–2 and a saturated linkage between C–1 and C–2.

17. A compound of the following formula:

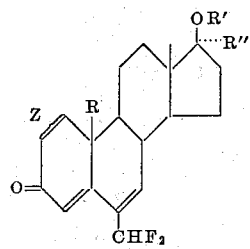

wherein R is selected from the group consisting of hydrogen and methyl; R′ is selected from the group consisting of hydrogen and a hydrocarbon carboxylic acyl group of less than 12 carbon atoms; R″ is selected from the group consisting of hydrogen and an aliphatic hydrocarbon group containing up to 8 carbon atoms; and Z is selected from the group consisting of a double bond between C–1 and C–2 and a saturated linkage between C–1 and C–2.

18. A compound selected from the group consisting of those having the formula:

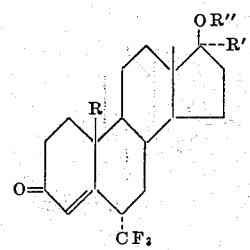

wherein R is selected from the group consisting of hydrogen and methyl, R′ is selected from the group consisting of methyl and ethinyl, and R″ is selected from the group consisting of hydrogen and lower alkanoyl; and the 1-dehydro, 6-dehydro, and 1,6-bisdehydro derivatives thereof.

19. In the process of producing C–6-monofluoromethyl derivatives of the androstane series the steps comprising a 6β-hydroxymethyl derivative of the androstane series with mesyl chloride, reacting the thus formed mesylate with an alkali metal fluoride in an inert solvent to form the corresponding 6β-monofluoromethyl derivative and thereafter inverting said 6β-monofluoromethyl derivative upon treatment with an acid.

References Cited by the Examiner

UNITED STATES PATENTS

| | | | |
|---|---|---|---|
| 2,838,549 | 6/1958 | Herr et al. | 260—397.45 |
| 2,842,572 | 7/1958 | Herr et al. | 260—397.45 |
| 2,867,630 | 1/1959 | Pederson et al. | 260—397.3 |
| 2,877,240 | 3/1959 | Campbell et al. | 260—397.4 |

OTHER REFERENCES

Smith et al., 81 J.A.C.S. 3165–66 (1959).

LEWIS GOTTS, *Primary Examiner.*

L. H. GASTON, MORRIS LIEBMAN, *Examiners.*